(12) United States Patent
Alecu

(10) Patent No.: US 7,685,805 B2
(45) Date of Patent: Mar. 30, 2010

(54) TURBOFAN GAS TURBINE ENGINE AND NACELLE ARRANGEMENT

(75) Inventor: Daniel T. Alecu, Toronto (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 651 days.

(21) Appl. No.: 11/561,601

(22) Filed: Nov. 20, 2006

(65) Prior Publication Data

US 2008/0118348 A1    May 22, 2008

(51) Int. Cl.
   *F02K 3/04* (2006.01)
(52) U.S. Cl. .................................. 60/226.1; 60/262
(58) Field of Classification Search .............. 60/226.1, 60/226.2, 226.3, 262, 263, 269, 785; 244/53 R
   See application file for complete search history.

(56) References Cited

U.S. PATENT DOCUMENTS

| 3,867,813 | A | | 2/1975 | Leibach |
| 4,047,381 | A | * | 9/1977 | Smith ........................ 60/226.2 |
| 7,334,395 | B2 | * | 2/2008 | Tweedie et al. ............ 60/226.2 |
| 2005/0060982 | A1 | | 3/2005 | Mani et al. |

OTHER PUBLICATIONS

International Search Report, PCT/CA2007/001866, Jan. 15, 2008.

* cited by examiner

*Primary Examiner*—Louis J Casaregola
(74) *Attorney, Agent, or Firm*—Ogilvy Renault

(57) ABSTRACT

The arrangement comprises a fan by-pass duct located within the nacelle and having an inlet and an outlet. The outlet is generally oriented substantially radially and at an intermediary location along the nacelle. The nacelle has an aft section with an initially convex and substantially outwardly extending surface adjacent to the outlet of the fan by-pass duct. The surface of the aft section decreases in curvature and becomes concave towards a rear end of the engine.

7 Claims, 5 Drawing Sheets

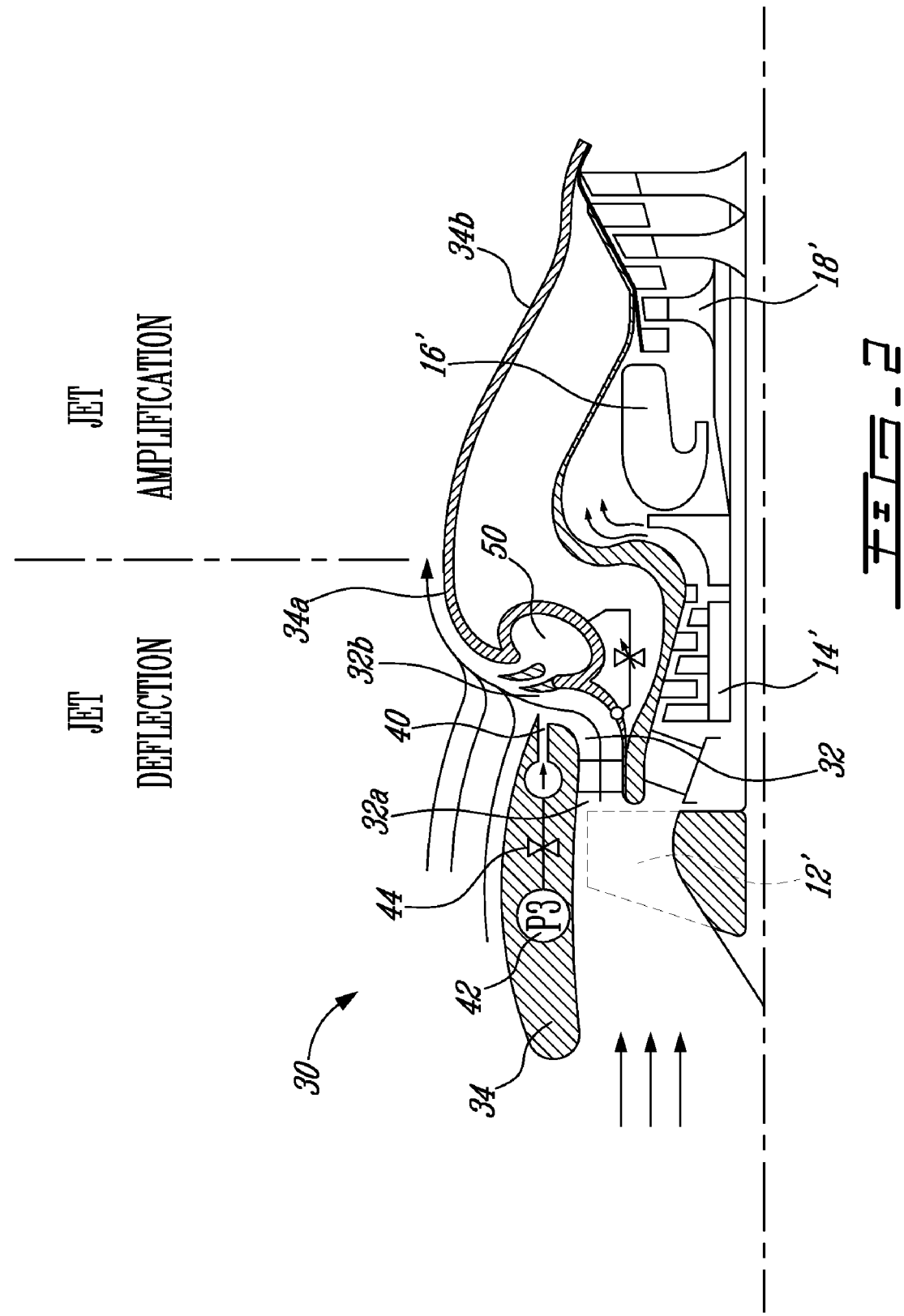

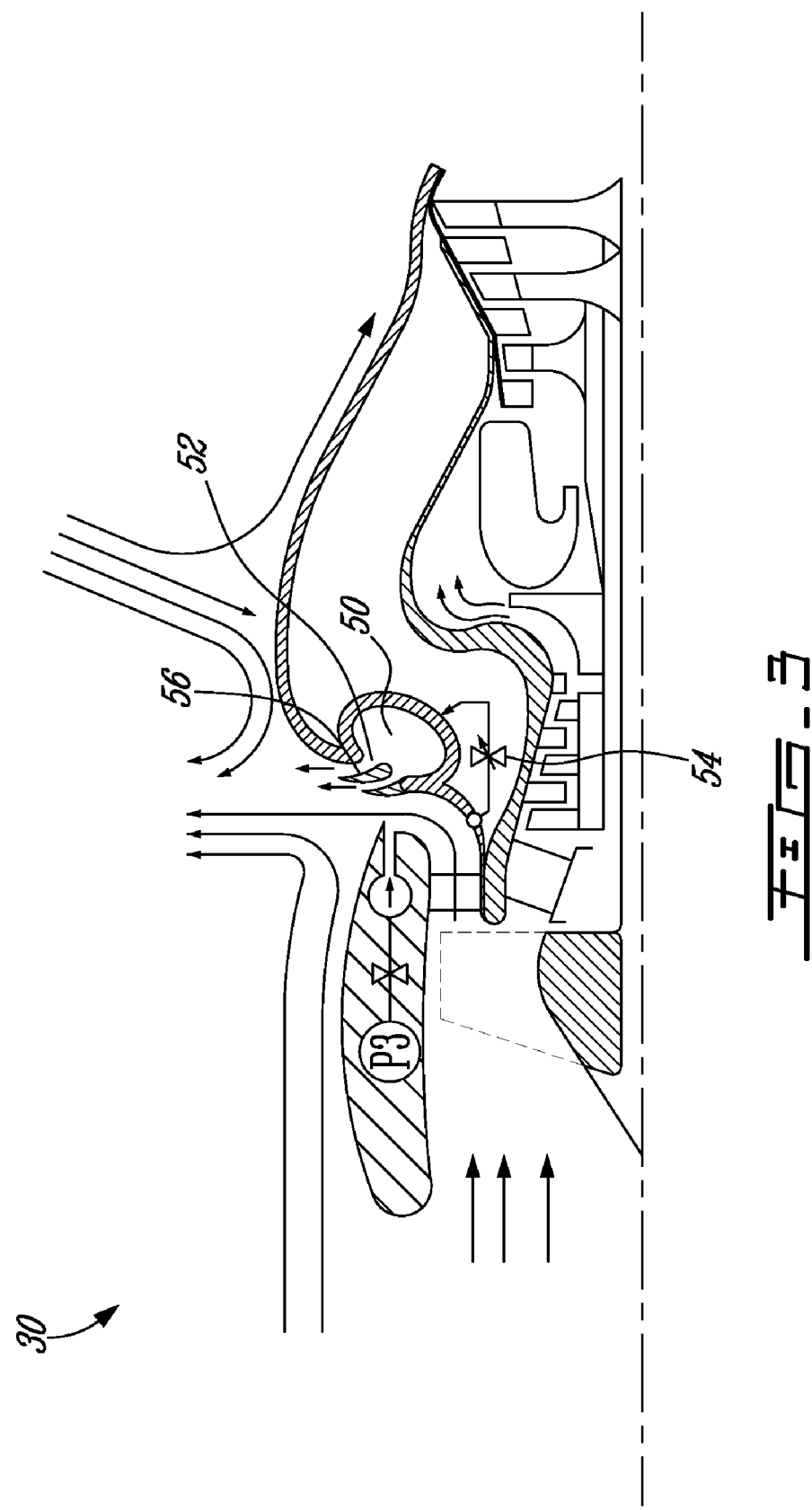

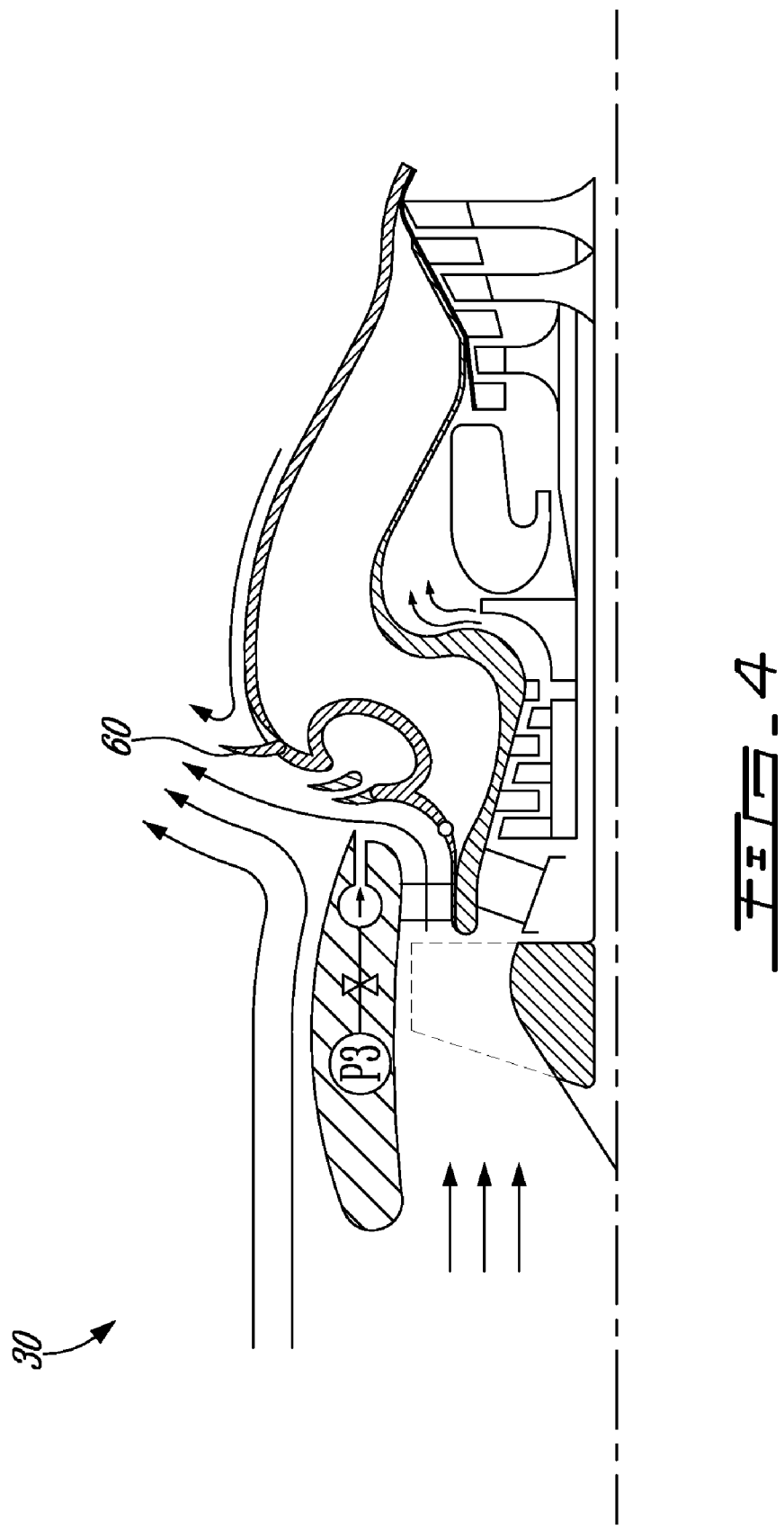

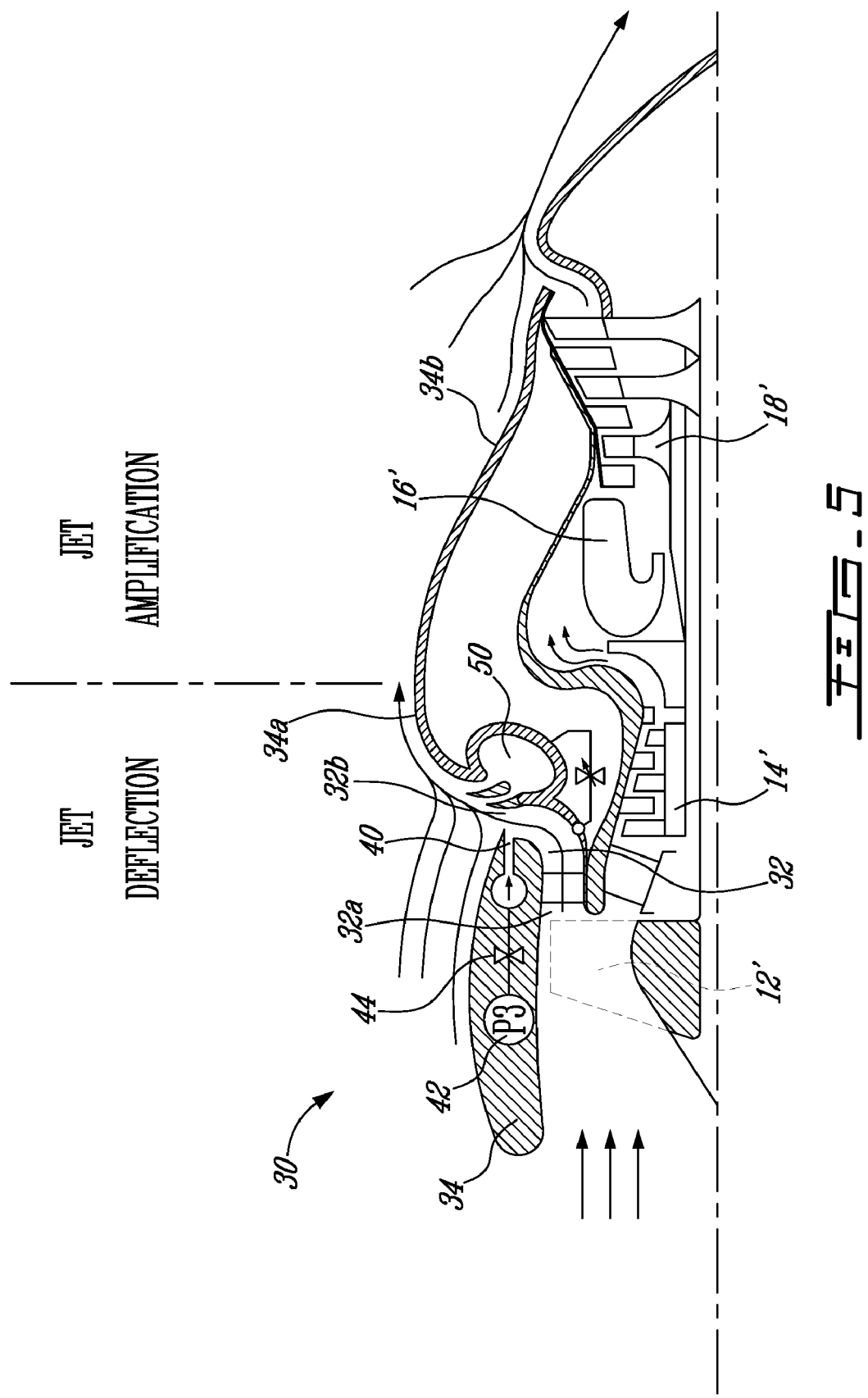

TURBOFAN GAS TURBINE ENGINE AND NACELLE ARRANGEMENT

TECHNICAL FIELD

The invention relates to a turbofan gas turbine engine and nacelle arrangement.

BACKGROUND

There have been several different arrangements proposed in the past between turbofan gas turbine engines and nacelles. Although these arrangements were satisfactory to a certain degree, there was still a need to provide an improved arrangement capable of increasing the thrust and the trust efficiency of a turbofan gas turbine engine. It was also desirable to provide an arrangement capable of providing an optimal engine cycle with a minimal weight increase.

SUMMARY

In one aspect, the present concept provides a turbofan gas turbine engine and nacelle arrangement comprising: a fan by-pass duct located within the nacelle and having an inlet and an outlet, the outlet being generally oriented substantially radially and at an intermediary location along the nacelle; and the nacelle having an aft section with an initially convex and substantially outwardly extending surface adjacent to the outlet of the fan by-pass duct, the surface of the aft section decreasing in curvature and becoming concave towards a rear end of the engine.

In another aspect, the present concept provides a nacelle for a turbofan gas turbine engine, the nacelle comprising a front section and an aft section, the aft section having a continuous external surface, the front and the aft section being separated by a fan by-pass outlet, the surface of the aft section having a jet deflection portion adjacent to the outlet, and a jet amplification portion located between the jet deflection portion and the rear end of the engine.

In a further aspect, the present concept provides a method of operating a turbofan gas turbine engine having an inlet, the method comprising: by-passing a portion of the air that flows through the inlet; ejecting the by-passed air on the side of the nacelle; and then deviating the by-passed air along a convex surface having a decreasing curvature and becoming concave towards a rear end of the engine, the deviated by-passed air decreasing static pressure around the convex portion of the aft section of the nacelle and increasing the jet cross section at the rear end thereof.

Further details of these and other aspects of the improved turbofan and nacelle arrangement will be apparent from the detailed description and figures included below.

BRIEF DESCRIPTION OF THE FIGURES

For a better understanding and to show more clearly how it may be carried into effect, reference will now be made by way of example to the accompanying figures, in which:

FIG. 2 is a schematic view of an example of the improved turbofan and nacelle arrangement;

FIG. 3 is a schematic view showing the arrangement of FIG. 2 during thrust reversal;

FIG. 4 is a schematic view showing an example of the improved turbofan and nacelle arrangement when operated at low speeds; and FIG. 5 is a schematic view showing another example of the improved turbofan and nacelle arrangement.

DETAILED DESCRIPTION

Figure 1:
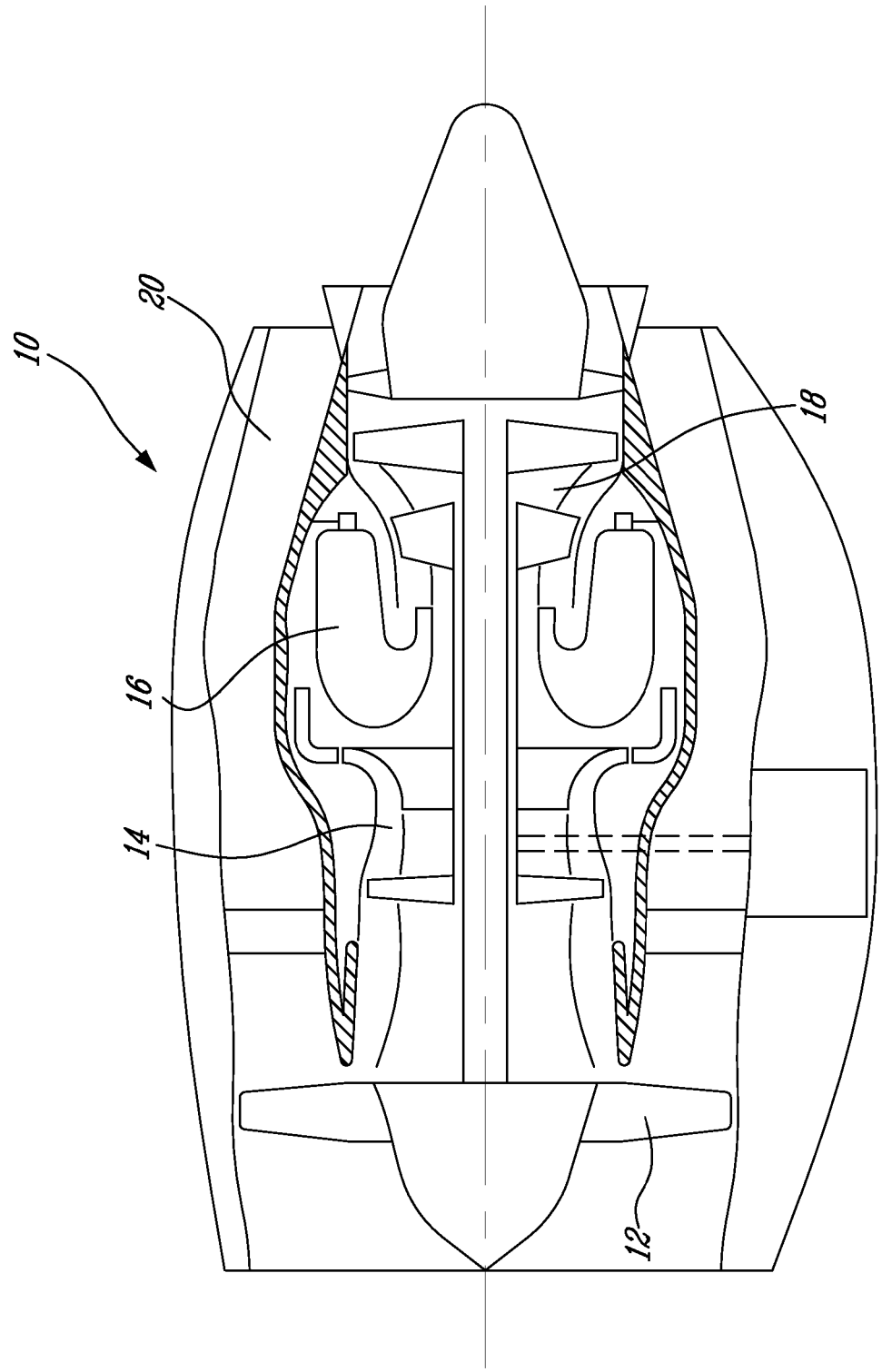
FIG. 1 schematically shows an example of a prior art generic turbofan gas turbine engine.

FIG. 1 illustrates a prior art turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. In the illustrated arrangement, by-pass air flows longitudinally around the engine core through a by-pass duct 20 provided within the nacelle.

FIG. 2 illustrates schematically an example of an improved turbofan and nacelle arrangement 30. The engine comprises a fan 12', a multistage compressor 14', a combustor 16' and a turbine section 18'. However, instead of a by-pass duct similar to the by-pass duct 20 of the engine 10 shown in FIG. 1, the arrangement shown in FIG. 2 includes a fan by-pass duct 32 that is considerably shorter. The fan by-pass duct 32 has an annular inlet 32a located downstream the fan 12' and an annular outlet 32b generally oriented substantially radially and at an intermediary location along the nacelle 34. In the illustrated embodiment, all the by-pass flow exits through the fan by-pass outlet 32b at the intermediary location, where the flow is further accelerated by having a smaller cross-sectional area at the outlet 32b compared to the remainder of the by-pass duct 32.

The nacelle 34 is designed with an aft section wider than the front section thereof. The aft section has an initially convex outer surface 34a which extends substantially outwardly adjacent to the outlet 32b of the fan by-pass duct 32. The nacelle 34 has an outer surface 34b which decreases in curvature and becomes concave towards the rear end of the engine. The radial jet exiting the bypass outlet 32b is deflected backwards over the convex portion 34a due to the Coanda effect. This generates a forward thrust component, which results from a very low static pressure distributed over the convex surface 34b. The intense ambient air entrainment over the curved surface increases significantly the jet cross section, thus the external entrainment surface. Also, the intense entrainment of the ambient fluid bends the nacelle external flow stream lines inwards. Eventually, the stream lines are forced back to the axial direction by the nacelle boat-tail, which generates a forward thrust component. The forward thrust component takes the form of a static pressure increase on the boat-tail. The additional thrust adds to the basic jet momentum.

The fan by-pass air can be controlled using one or more auxiliary circumferential outlets 40 providing pressurized air deviated from a pressurized air source 42. The operation of the auxiliary outlet 40 is controlled by at least one valve 44. The pressurized air source 42 may include a bleed port from a stage of the multistage compressor 14' of the engine. Air is provided through the auxiliary outlet or outlets 40 for maintaining the fan 12' on the optimum working line. As an alternative, moving axially the forward lip, as a whole or as independent sectors, of the outlet 32b using mechanical, hydraulic, pneumatics or electrical actuators can control the effective cross section area of the bypass outlet 32b.

In use, a portion of the air that flows through the fan 12' is by-passed and ejected on the side of the nacelle 34. The deviated by-passed air then flows along a convex trajectory on the convex surface 34a. In about a first half, the air is in a zone referred to as the jet deflection zone. When the air reaches the other side of the aft section of the nacelle 34, it is in a zone referred to as the jet amplification zone.

FIG. 3 schematically illustrates a possible example of the arrangement of FIG. 2 during thrust reversal. During thrust reversal, some of the air is deviated in a cavity 50 within the convex surface 34a. The pressurized air is then sent through a plurality of outlet ports 52 adjacent to the outlet 32b of the by-pass duct 32. The air injected by the outlet ports 52 in the very low-pressure area of the convex surface 34a induces a large instability in the deflected jet, which determines the jet detachment from the convex surface 34a. The jet reattaches to the convex surface 34a as soon as the air supply into the cavity 50 is stopped. The air flow rate into the cavity 50 required to achieve complete jet detachment is very small compared to engine bypass flow due to particular instabilities of the Coanda effect. With the jet momentum axial component being zero, the engine net thrust becomes negative and equal to the engine air inlet flow momentum rate.

FIG. 4 shows an alternative arrangement, in which the convex surface 34a has a plurality of flaps 60 located downstream the fan by-pass outlet 32b. The flaps 60 may pivot forward in order to increase the nacelle frontal area at low speed during takeoff.

As can be appreciated, the improved arrangement 30 can provide an increased thrust and thrust efficiency in a turbofan gas turbine engine, all with a minimal weight increase. Also, the short mixing length of the jet with the ambient air provides a reduced noise radiation.

The above description is meant to be exemplary only, and one skilled in the art will recognize that other changes may also be made to the embodiments described without departing from the scope of the invention disclosed as defined by the appended claims. For instance, the engine and the nacelle can be different from what is shown in the figures. The outlet of the by-pass duct may cover only one or more sectors of the nacelle circumference. The arrangement described for the engine by-pass flow may be implemented also for the engine core flow, i.e. the hot gases exiting the engine turbine are deflected through a radial slot over a convex external surface continued with a conical boat tail as in FIG. 5. Still other modifications which fall within the scope of the present invention will be apparent to those skilled in the art, in light of a review of this disclosure, and such modifications are intended to fall within the appended claims.

What is claimed is:

1. A turbofan gas turbine engine and nacelle arrangement comprising:
    a fan by-pass duct located within the nacelle and having an inlet and an outlet, the outlet being generally oriented substantially radially and at an intermediary location along the nacelle; and
    the nacelle having an aft section with an initially convex and substantially outwardly extending surface adjacent to the outlet of the fan by-pass duct, the surface of the aft section decreasing in curvature and becoming concave towards a rear end of the engine.

2. The arrangement as defined in claim 1, wherein the aft section of the nacelle is wider than a front section thereof.

3. The arrangement as defined in claim 1, further comprising at least one auxiliary outlet in fluid communication with the outlet of the fan by-pass duct, the auxiliary outlet being connected through a valve to a pressurized air source.

4. The arrangement as defined in claim 1, further comprising a plurality of thrust reverser outlets adjacent to the outlet of the by-pass duct, the reverser outlets being configured and disposed to deliver an auxiliary air flow into the region of the least static pressure over the concave surface such that a jet is destabilized and detaches from convex surface and thus continue to travel in a substantially radial direction.

5. The arrangement as defined in claim 4, wherein the air ejected through the plurality of reverser outlets is controlled by at least one valve.

6. The arrangement as defined in claim 4, wherein the thrust reverser outlets comprises fixed slots.

7. The arrangement as defined in claim 1, further comprising flaps to increase an overall width of the convex surface of the nacelle when the engine is operating at low speeds.

* * * * *